Oct. 1, 1963   J. HÄNNY   3,105,631
EXPANSION TURBINE HAVING A GAS BEARING
Filed Nov. 16, 1961   3 Sheets-Sheet 1

INVENTOR
JOST HÄNNY

Oct. 1, 1963     J. HÄNNY     3,105,631
EXPANSION TURBINE HAVING A GAS BEARING
Filed Nov. 16, 1961     3 Sheets-Sheet 3

INVENTOR
JOST HÄNNY
BY
ATTORNEYS

United States Patent Office 3,105,631
Patented Oct. 1, 1963

3,105,631
EXPANSION TURBINE HAVING A GAS BEARING
Jost Hänny, Winterthur, Switzerland, assignor to Sulzer Freres, Societe Anonyme, Winterthur, Switzerland, a Swiss company
Filed Nov. 16, 1961, Ser. No. 152,790
Claims priority, application Switzerland Aug. 15, 1961
8 Claims. (Cl. 230—116)

The present invention relates to an expansion turbine destined to the cooling of a gaseous medium and to a braking system driven by the turbine, the common shaft of the two machines being borne in gaseous bearings.

The invention is particularly adapted for the shaft bearings of high speed expansion turbines having rotors of relatively small weight operating at rotational speeds of from 10,000 to 300,000 r.p.m. and more.

In accordance with the invention several bearing elements for the shaft are disposed about and fitted to the periphery of the shaft between the fixed portion of the bearing and the shaft itself. For the reception and support of these elements in the fixed portion of the bearing there are provided suitably shaped recesses to which gas under pressure is fed through passages formed in the fixed part of the bearing. Further according to the invention, control means are provided which increase the gas pressure with increasing rotational speed of the shaft and vice versa in such fashion that hydrostatic bearings or cushions are formed between the bearing elements and their recesses whereas a hydrodynamic bearing is formed between the elements and the rotating shaft. The bearing elements accordingly float in a gas. The bearing elements may have, in cross section perpendicular to the axis of the shaft, the shape of a segment comprised between an arc of a circle of relatively small diameter, fitted to a corresponding recess in the fixed part of the bearing, and an arc of a circle of larger diameter, this arc of larger diameter being an arc on a radius slightly larger than the radius of the shaft. The bearing elements which thus float in gas will therefore sometimes be referred to as segments, or as segment-shaped elements.

The invention achieves a stable condition of equilibrium for the segments by virtue of the partly hydrodynamic and partly hydrostatic formation of the gas bearing, the position of the segments being self-regulating in the gas as soon as gas is introduced under pressure into the clearance between the recesses in the fixed portion of the bearing and the segments. This is so effected that the pressure of the gas being introduced corresponds to the rotational speed of the shaft. If immediately on starting up of the turbine, gas under a pressure appropriate to conditions when high speed has been reached, were introduced into the clearance between the recesses and the segments, the segments might under certain circumstances be brought into contact with the shaft and effect a braking action thereon by virtue of the fact that at low speeds a hydrodynamic bearing of adequate load-bearing capacity has not been formed between the segments and the shaft.

Regulation of the pressure of the gas supplied so that the pressure increases continuously with increasing shaft speed according to the invention achieves the result that the forces exerted by the hydrostatic bearings on the individual segments are no greater than the forces exerted thereon by the hydrodynamic bearings brought into existence between the shaft and the segments. The result is that the segments float in the gas unaffected by variations in shaft speed. For, even in the event of a sudden reduction in shaft speed such as might occur in the event of a drop in pressure at the inlet to the turbine, the feed pressure of the gas supplied to the bearings likewise declines, so that even in this case the stresses exerted on the segments by the hydrostatic and hydrodynamic bearings respectively remain in equilibrium.

Upon application of the invention to an expansion turbine employing a compressor as a brake in which the compressor operates in a closed gas cycle employing the same gas as that which passes through the turbine, it is advantageous to draw the gas for the bearings directly from the high pressure side of the compressor. This is true because the starting characteristics of a compressor fulfill the requirements for development of pressure in the hydrostatic bearing. In such an embodiment of the invention the gas compressor itself serves as a regulator for the gas pressure in the bearing. In certain circumstances it may be advantageous additionally to insert an adjustable throttling device into a junction line between the high pressure side of the compressor and the input channels to the bearing. This device can moreover if necessary be controlled as a function of shaft rotational speed by means of a suitable measuring device, such as that shown in FIGS. 6 and 7.

In the case where the gas bearing is fed from a separate gas source (although this gas may be of the same nature as that passing through the turbine) an adjustable throttling device is inserted into the junction line between this source and the feed channels to the bearing, this device being controlled by a measuring apparatus responsive to the speed of shaft rotation.

The invention will now be further described with reference to the accompanying drawings in which.

Figure 1:
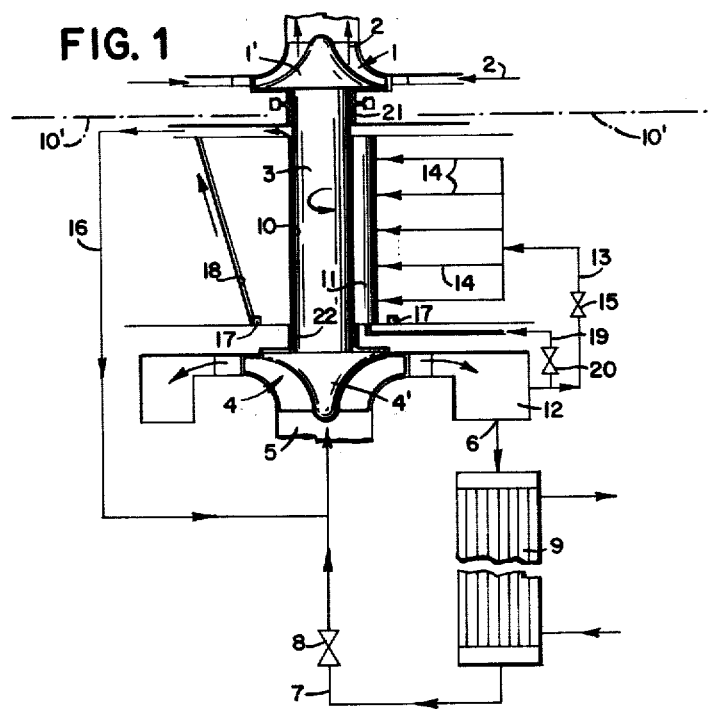
FIG. 1 shows schematically an expansion turbine and a compressor driven thereby, the working substance operated on by the compressor flowing in a closed cycle.

In FIG. 1 the rotor 1' of a turbine 1 is supported on the same shaft 3 as the rotor 4' of a turbo compressor 4, the turbine being disposed in a cyclical closed path indicated at 2 for the gas (e.g. hydrogen or helium) of a low temperature refrigeration system, other elements of which system are not shown. The compressor 4 is disposed in a closed gas cycle, its low and high pressure sides being indicated at 5 and 6. The cycle including the compressor is generally indicated at 7 and operates on the same gas as the cycle 2. The cycle 7 includes a throttling device 8 of adjustable cross sectional aperture and it further includes a water cooler 9, i.e. a heat exchanger employing water to extract heat from the gas cycle 7 passing through that heat exchanger. By means of the cooler the energy supplied from the turbine to the compressor and transferred by the latter by compression to the gas in cycle 7 is withdrawn from the system, the gas delivered by the compressor being cooled in cooler 9. A conduit 13 connects with the annular outlet space 12 of the compressor for the supply of gas under pressure to the gas bearing 10 of the shaft. The conduit 13 opens into feed conduits 14 distributed along the length of the shaft. In the drawing only a single segment 11 is shown, there being a plurality of such segments disposed about the shaft. In the coupling 13 there is disposed an adjustable throttling valve 15 which at any given setting effects a pressure reduction. The gas outlet terminals of the bearing (at the axial ends thereof) are connected to the low pressure inlet 5 of the compressor 4 via a conduit 16 and a conduit 18 connected to an annular space 17, the conduit 18 leading into conduit 16. For support of the segments 11 by means of gas against axial displacement, and with a vertical arrangement of the turbine-compressor set as indicated in the drawing, a conduit 19 is connected to the annular outlet space 12 of the compressor. The conduit 19 opens into a clearance between the fixed portion of the bearing on the compressor end of the shaft and the surfaces of the segments facing the compressor. For adjustment of the gas input pressure here a throttling valve 20 is provided in the conduit 19. For sealing of the turbine and compressor from each other. There are provided labyrinths 21 and 22. As indicated by the dashed line 10', the compressor 4, the gas cycle 7 and also the gaseous bearing 10 may operate at room temperature, for example +20° C., whereas the turbine 1 operates at the low temperature of the refrigeration system.

Figure 2:
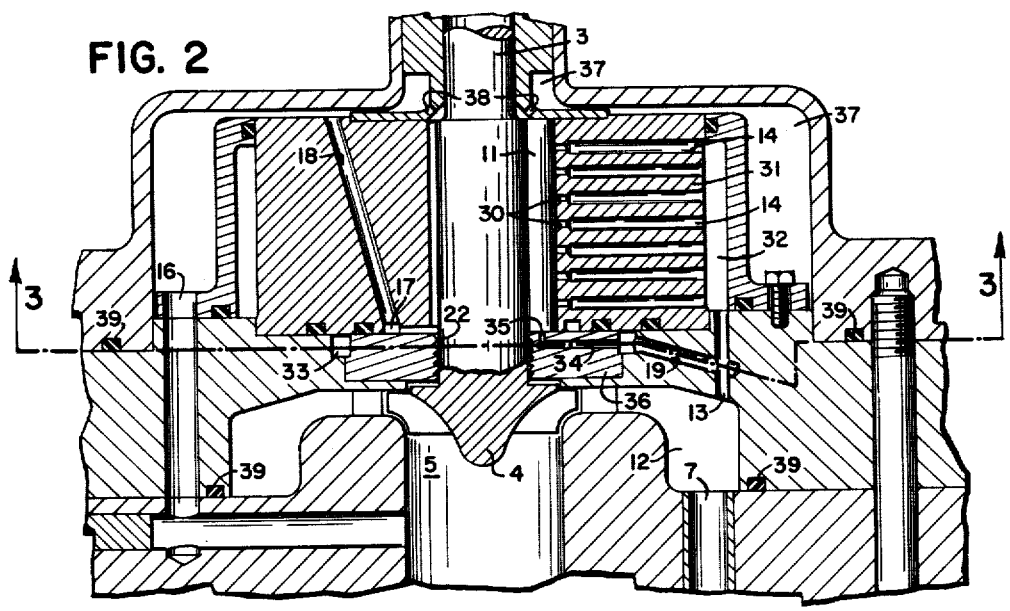
FIG. 2 is a partial axial section through the compressor and gas bearing of FIG. 1.

In FIG. 2 there is shown a detailed longitudinal section through the gaseous bearing and compressor of an installation corresponding substantially to that of FIG. 1. In departure however from FIG. 1, in which the conduit 13 includes a throttling device 15, the corresponding throttling effect is transferred in FIG. 2 to locations 30 in the gas input conduits 14 of the fixed bearing portion 31. The coupling conduit 13 opens into an annular space 32 surrounding the fixed bearing portion 31, the channel 32 being connected with the feed conduits 14 which open into clearances between the segments 11 and the fixed bearing portion. In the figure only a single conduit 13 is shown. It is of course possible to provide plural conduits between the annular spaces 12 and 32.

Figure 3:
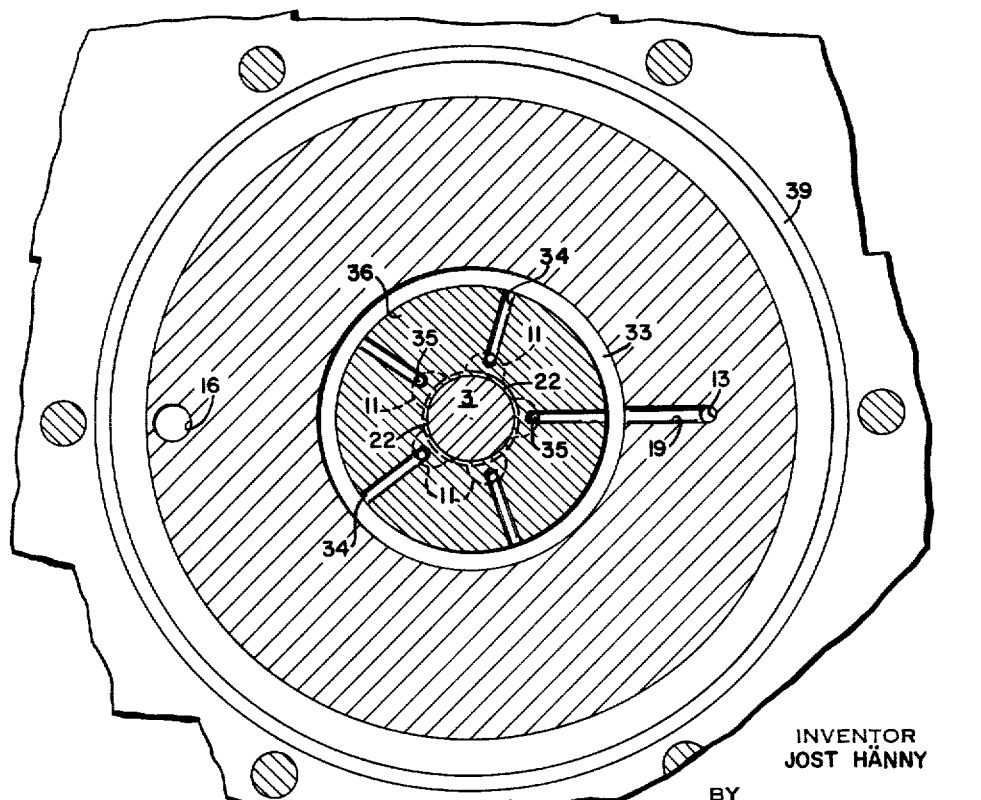
FIG. 3 is a cross section taken on the line 3—3 of FIG. 2.

As is apparent from the cross sectional view of FIG. 3, the gaseous bearing in this embodiment comprises five segments 11 disposed about the shaft 3. The gas under pressure for axial support of the segments against axial displacement is fed from the annular channel 12 through the channels 13 and 19 via an annular space 33 and through input conduits 34, the latter leading through throttling apertures 35 into the clearance between the fixed bearing portion 36 and the axial end faces of the segments.

For the exit of gas from the clearances between the shaft and the segments and between the shaft and the fixed bearing portion 31, there is provided a connecting conduit 18 opening into the annular space 17. An annular channel 37 surrounding the fixed bearing portion 31 is connected with the upper end of the bearing clearance by means of openings 38 for exhaust of the bearing gas, and at the lower end of the bearing the space 37 connects with return channel 16 leading back to the low pressure end of the compressor 4. Reference character 39 identifies packing rings for mutual isolation of the spaces in the fixed part of the bearing.

Figure 4:
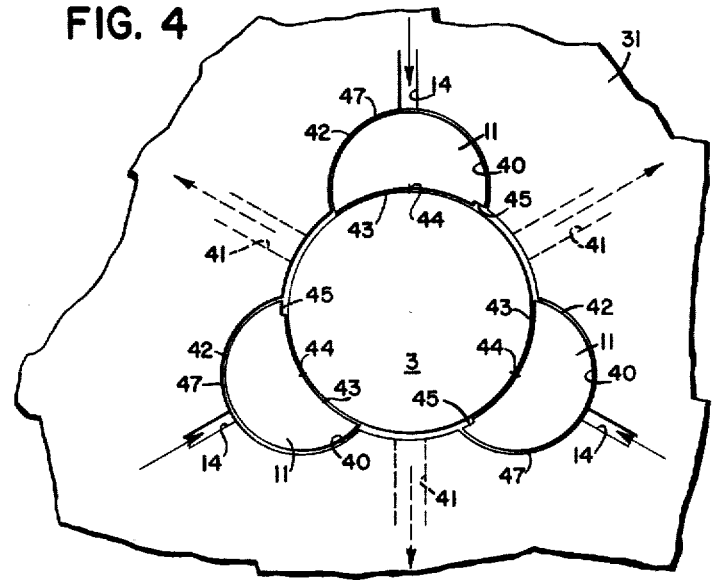
FIG. 4 is a transverse sectional view through a bearing according to the invention including three segments.
Figure 5:
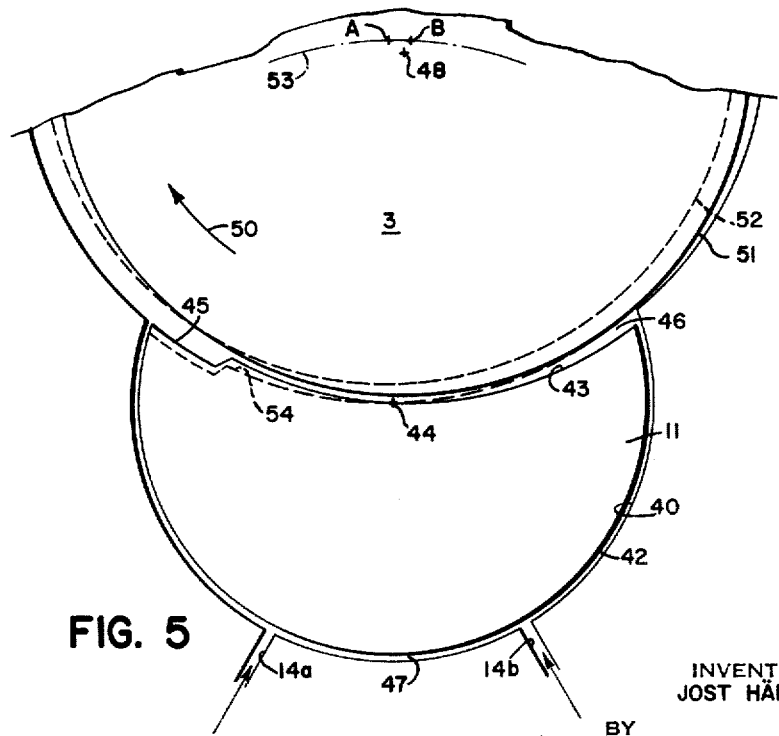
FIG. 5 is a fragmentary showing at an enlarged scale of a portion of the apparatus shown in FIG. 4.

In FIG. 4 there is shown a horizontal section through a bearing according to the invention including three segments whereas FIG. 5 shows at an enlarged scale a portion of the sectional view of FIG. 4 with a modification of the means for supply of the bearing gas.

In FIG. 4 segments 11 are distributed about the shaft between the shaft 3 and a fixed bearing portion 31. The segments, which are advantageously made of self-lubricating material such as graphite, are seated in cylindrical recesses 40 formed in the fixed bearing portion 31, and conduits 14 for the supply of gas under pressure open into these recesses whereas conduits 41 for withdrawal of bearing gas are disposed in the bearing portion 31, leading away from the clearance between shaft 3 and portion 31 between adjacent segments 11. The segments 11 are provided with cylindrical surfaces 42 and 43 matched respectively to the recesses 40 and to the shaft 3 and are rotatable about axes 44 of the cylindrical surfaces 42.

Each segment 11 is provided with a step or recess 45 at one circumferential limit of its bearing surface 43 presented to the shaft, extending axially of the bearing surface 43. If one considers one of the two lower segments 11 in FIG. 4, one may observe that the center line of the cylindrical surface 43, which with a completely symmetrical shape of the segments (i.e. in the absence of any recess 45) would coincide with the axis of rotation 44 defined for each segment at 44 by its recess 40, is displaced from 44. This displacement is such that, as illustrated in FIG. 5, upon an eccentric displacement of the shaft, the resultant of the force exerted on the shaft by the wedge-shaped clearance 46 continues to be directed towards the axis 44. The result is a motion of the segments under load similar to that which occurs in Mitchell bearings and a stable positioning of the segments 11, within the range of positions available thereto by rotation about their axes of rotation 44.

During operation, the elements 11 are borne by the gas introduced under pressure into the clearances 47 (FIG. 4) between surfaces 40 and 42. This means that a hydrostatic gaseous bearing is formed in the clearances 47. The gas is drawn into the clearances 46 between the segments and the shaft in consequence of its viscosity and of the rotation of the shaft. In this fashion a hydrodynamic gas bearing is formed between the shaft and the segments. According to the invention the pressure at which the gas in introduced into the clearances 47 is controlled according to the speed of the shaft. This may be done by connecting the gas inlet conduits with the annular space 12 of the compressor as in the embodiments of FIGS. 1 to 3. In case the bearing is fed with the gas from a separate source, as in FIG. 6, this may be done by control of a throttling device 64 disposed in the line leading to the gas input conduits, this throttling device being controlled by means of a device which measures the speed of shaft rotation.

The introduction of gas under pressure into the clearance between the segments and the fixed portion of the bearing causes the formation of a gaseous cushion in which the bearing segments float in their respective recesses. Gas is drawn out of the hydrostatic gas bearing into the clearance between the shaft and the segments in consequence of the viscosity of the gas and in consequence of the rotation of the shaft. This represents the formation of a so-called hydrodynamic gas bearing. In addition to the advantage of a small consumption of gas in the clearances, the invention achieves a stable floating of the segments in the gas since the gas pressure control as a function of shaft speed effects the result that the forces exerted on the individual bearing segments in the clearances 46 and 47 are respectively equal and opposite, even on starting up of the turbine.

When the bearing of the invention is employed in an embodiment in which the compressor serves as a brake, the conduits 41 for withdrawal of gas from the bearing are connected to the low pressure side of the compressor. See FIGS. 1, 2 and 3. On the other hand, when the bearing is fed with gas from a separate source, the conduits 41 may, if desired, be connected directly to the atmosphere. If for any reason the shaft with its axis 48 were to undergo a supplementary rotation about the axis of the bearing itself, also identified at 48, as illustrated in FIG. 5, the shaft will approach the segments 11 and recede therefrom in an oscillatory manner. Each segment can in this case shift radially outward, with approach to each other of the surfaces 40 and 42, and it can also rotate in one or the other direction about its axis 44. If in the course of such supplementary rotation the shaft 3 should shift toward the radially inner bearing surface 43 of the segment in question, the latter will correspondingly shift about its axis 44 until the shaft recedes from that segment with growth of the clearance 46 there, whereupon the shaft 3 will approach the circumferentially adjacent segment.

In other embodiments, the disposition of the axes 44 of the segments is somewhat different. They may lie on the radius passing through the axes 48 and 44.

In FIG. 5 there is shown a diagram of the results which occur in the event of a supplementary rotation (which as is well known appears for a shaft rotational speed of about double the critical bearing frequency) or for a displacement of the shaft axis 48 otherwise produced. In this FIG. 5 the shaft 3, whose sense of rotation is indicated by the arrow 50, is shown with its axis 48 displaced from the bearing axis A. Accordingly the periphery 51 of the shaft lies in the position indicated by full lines whereas when the shaft is free of supplementary rotation with the shaft axis 48 and bearing axis A coinciding, the surface of the shaft occupies the position shown in dash lines at 52. The segment 11 of FIG. 5 is moreover shown displaced clockwise about the axis 44 into the stable position shown, in which the bearing surface 43 occupies the position shown in full lines therefor. The mid-axis of the cylindrical surface corresponding to this position is the axis B which is displaced to the right from the original position therefor coinciding with the axis A. This displacement is to the right along the circle 53 drawn about the axis 44. In the original position of the bearing surface 43, shown in dashed lines at 54, the corresponding mid-axis coincides with the bearing axis A.

In FIG. 5 the bearing gas is introduced into the clearance 47 through a pair of supply channels 14a and 14b.

Figures 6, 7:
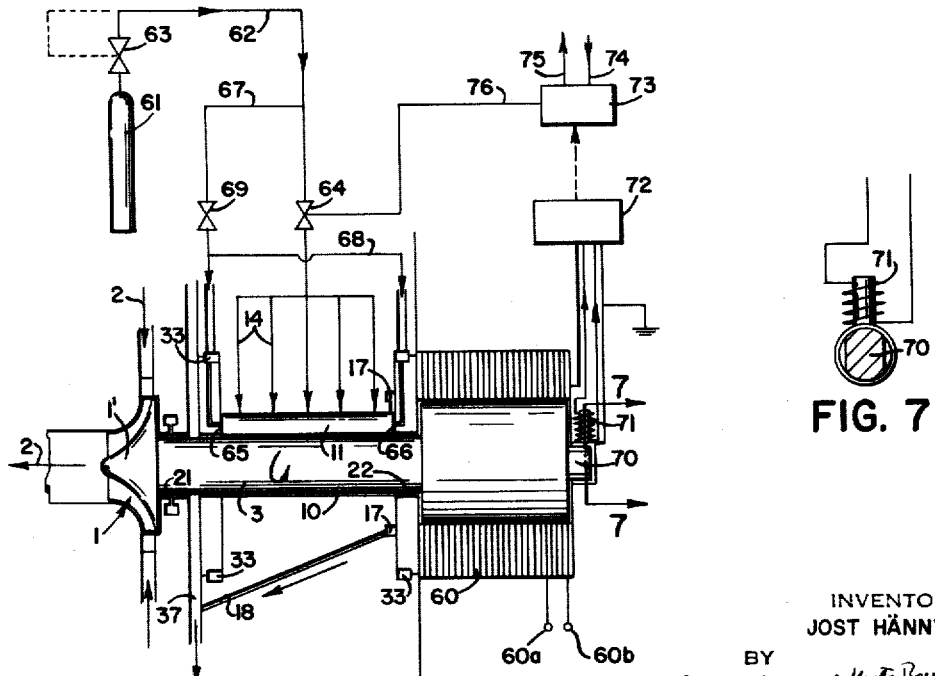
FIG. 6 is a diagram of an expansion turbine whose output is supplied to an electric generator, the gas bearing being fed from a separate source of gas.
FIG. 7 is a representation of apparatus for measuring the rotational speed of the turbine shaft.

FIG. 6 shows an embodiment of the invention in which the turbine 1 is coupled to a generator 60 for dissipation of the mechanical energy developed in the turbine. The electric energy developed in the generator is delivered via electrical terminals 60a and 60b to a load. The gaseous bearing 10 is supplied with gas from a separate source, for example the bottle 61 of compressed gas. Advantageously there is employed in the gaseous bearing the same gas as that which flows through the expansion turbine. The gas for the bearing may alternatively be taken in part from the high pressure side of the principal compressor of the refrigeration system of which the expansion turbine forms a part. The gas for the bearing is drawn from the bottle 61 through a conduit 62 to the input channels 14 of the bearing. In the conduit 62 there is provided a reducing valve 63 in order to hold the pressure constant in that conduit and in addition there is provided a throttling valve 64 which may in accordance with the invention be adjusted as a function of shaft rotational speed with the aid of a suitable measuring device.

Since the turbine-generator unit is disposed with its shaft horizontal, the segments 11 of the gas bearing are limited by means of gas bearings against axial motion in both directions. These axial or thrust bearings 65 and 66 are supplied with gas from the bottle 61 via conduits 67 and 68, and via the annular spaces 33. The throttling valve 69 disposed in conduit 67 serves to reduce the pressure in the conduit 62 to a level suitable to the thrust bearings 65 and 66.

For measurement of the shaft speed a rotating member 70 is fastened to the rotor of the generator 60. The circular cross section of this member includes two cutouts at diametrically opposite points as indicated in FIG. 7. The generator and the element 70 may be constructed as a unit. Above the shaft 70 there is disposed a pick-up 71 which comprises essentially a magnetic core surrounded by a coil. Rotation of the shaft induces an alternating current voltage in the coil by reason of the periodically varying gap between the element 70 and the magnetic core of the pick-up 71. The frequency of this voltage is a function of shaft rotation speed. The alternating current voltage is transformed in a converter 72 into a direct current voltage of value representative of this frequency. This direct current voltage serves to control an electro-pneumatic converter 73 which may be of known type and to which input and output conduits 74 and 75 for compressed air are connected. By means of a control conduit 76, the throttling device 64 is adjusted to correspond to the shaft rotation speed and in this way there is effected a control of the bearing gas pressure as a function of shaft speed. In place of the control of the throttling element here shown as a function of shaft speed, it is of course possible to use other known types of pressure variation mechanisms operating as a function of shaft speed. The output side of the shaft bearing is in the embodiment shown connected directly with the atmosphere. If the same gas is used for the bearing as that which passes through the turbine, the output gas terminal of the bearing can be connected with the low pressure side of the cooling system of which the turbine constitutes an element.

From the foregoing it will be seen that the invention provides a turbine for the cooling of a gaseous medium by the expansion thereof, which turbine has a shaft borne in a gaseous bearing or bearings, with a load coupled to that shaft, the bearing comprising a stationary portion having a bore therethrough for the accommodation of said shaft and a plurality of cylindrical recesses below the surface of said bore, said bearing further comprising a plurality of segments disposed in said recesses between said stationary portion and shaft, means to supply a gas under pressure to said recesses, and means to vary the pressure of said gas directly with the speed of rotation of said shaft.

While the invention has been described herein in terms of a number of preferred embodiments, it is not restricted thereto. The scope of the invention is rather set forth in the appended claims.

I claim:

1. A turbine for the cooling of a gaseous medium, said turbine having a shaft borne in a gaseous bearing, and a load device coupled to said shaft, said bearing comprising a stationary portion having a bore therethrough for the accommodation of said shaft and a plurality of cylindrical recesses below the surface of said bore, said bearing further comprising a plurality of segments disposed in said recesses between said stationary portion and shaft, said segments having each a first cylindrical surface conforming with clearance to the cylindrical surface of its recess, a second cylindrical surface conforming with clearance to the surface of said shaft, and a third cylindrical surface at one circumferential limit of its said second cylindrical surface, said third cylindrical surface conforming to the surface of said shaft with greater clearance than its said second cylindrical surface, said bearing further comprising means to supply a gas under pressure to said recesses, and means to vary the pressure of said gas directly with the speed of rotation of said shaft.

2. A turbine for the cooling of a gaseous medium, said turbine having a shaft borne in a gaseous bearing, and a load device coupled to said shaft, said bearing comprising a stationary portion having a bore therethrough for the accommodation of said shaft and a plurality of cylindrical recesses below the surface of said bore, said bearing further comprising a plurality of segments disposed in said recesses between said stationary portion and shaft, said segments having each a first cylindrical surface conforming with clearance to the cylindrical surface of its recess, a second cylindrical surface conforming with clearance to the surface of said shaft, and a third cylindrical surface at one circumferential limit of its said second cylindrical surface, said third cylindrical surface conforming to the surface of said shaft with greater clearance than its said second cylindrical surface, said bearing further comprising a source of gas under pressure, conduit means connecting said source with said recesses, throttling means disposed in said conduit means, and means to adjust said throttling means in response to variations in the speed of said shaft to vary the pressure of the gas reaching said recesses directly with said speed.

3. A turbine for the cooling of a gaseous medium, said turbine having a shaft borne in a gaseous bearing, and a load device coupled to said shaft, said bearing comprising a stationary portion having a bore therethrough for the accommodation of said shaft and a plurality of cylindrical recesses below the surface of said bore, said bearing further comprising a plurality of segments disposed in said recesses between said stationary portion and shaft, said segments having each a first cylindrical surface conforming with clearance to the cylindrical surface of its recess, a second cylindrical surface conforming with clearance to the surface of said shaft, and a third cylindrical surface at one circumferential limit of its said second cylindrical surface, said third cylindrical surface conforming to the surface of said shaft with greater clearance than its said second cylindrical surface, said bearing further comprising means to supply a gas under pressure separately to the cylindrical surfaces of said recesses and to at least one of the end surfaces thereof, and means to vary directly with the speed of rotation of said shaft the pressure of at least the gas supplied to said cylindrical surfaces.

4. A turbine for the cooling of a gaseous medium, said turbine having a shaft borne in a gaseous bearing, and a load device coupled to said shaft, said bearing comprising a stationary portion having a bore therethrough for the accommodation of said shaft and a plurality of cylindrical recesses below the surface of said bore, said bearing further comprising a plurality of segments disposed in said recesses between said stationary portion and shaft, said segments having each a first cylindrical surface conforming with clearance to the cylindrical surface of its recess, a second cylindrical surface conforming with clearance to the surface of said shaft, and a third cylindrical surface at one circumferential limit of its said second cylindrical surface, said third cylindrical surface conforming to the surface of said shaft with greater clearance than its said second cylindrical surface, said bearing further comprising a source of gas under pressure, conduit means connecting said source with said recesses, throttling means disposed in said conduit means, means to develop a signal representative of the speed of rotation of said shaft, and means responsive to said signal operable on said throttling means to vary the pressure of the gas reaching said recesses directly with said speed.

5. In combination, an expansion turbine, a turbo compressor, a shaft, said turbine and turbo compressor being mounted on said shaft, a bearing for said shaft comprising a stationary portion having a generally cylindrical bore therethrough for the accommodation of said shaft and having further a plurality of recesses open to said bore for the accommodation of bearing segments, said bearing further comprising a plurality of segments movably supported one within each of said recesses, said segments having each a first surface conforming with clearance to the surface of its recess, a second surface conforming with clearance to the surface of said shaft, and a third surface at one circumferential limit of its said second surface, said third surface conforming to the surface of said shaft with greater clearance than its said second surface, said bearing further comprising conduit means connecting the high pressure side of said compressor to each of said recesses, and throttling means disposed in said conduit means.

6. In combination, an expansion turbine, a turbo compressor, a shaft, said turbine and turbo compressor being mounted on said shaft, a bearing for said shaft comprising a stationary portion having a generally cylindrical bore therethrough for the accommodation of said shaft and having further a plurality of recesses open to said bore for the accommodation of bearing segments, said bearing further comprising a plurality of segments movably supported one within each of said recesses, said segments having each a first surface conforming with clearance to the surface of its recess, a second surface conforming with clearance to the surface of said shaft, and a third surface at one circumferential limit of its said second surface, said third surface conforming to the surface of said shaft with greater clearance than its said second surface, said bearing further comprising conduit means connecting the high pressure side of said compressor to each of said recesses, throttling means disposed in said conduit means, means to develop a signal representative of the speed of rotation of said shaft, and means responsive to said signal operable on said throttling means to vary the pressure of the gas reaching said recesses directly with said speed.

7. In combination, an expansion turbine, a turbo compressor, a shaft, said turbine and turbo compressor being mounted on said shaft, a bearing for said shaft comprising a stationary portion having a generally cylindrical bore therethrough for the accommodation of said shaft and having further a plurality of recesses open to said bore for the accommodation of bearing segments, said bearing further comprising a plurality of segments movably supported one within each of said recesses, said segments having each a first surface conforming with clearance to the surface of its recess, a second surface conforming with clearance to the surface of said shaft, and a third surface at one circumferential limit of its said second surface, said third surface conforming to the surface of said shaft with greater clearance than its said second surface, said bearing further comprising conduit means extending from the high pressure side of said compressor to said recesses, throttling means disposed in said conduit means and conduit means connecting the clearance between said shaft and said stationary bearing portion adjacent the axially opposite ends of said segments with the low pressure side of said compressor.

8. In combination, an expansion turbine, a turbo compressor, a shaft, said turbine and turbo compressor being mounted on said shaft, a bearing for said shaft comprising a stationary portion having a generally cylindrical bore therethrough for the accommodation of said shaft and having further a plurality of recesses open to said bore for the accommodation of bearing segments, said bearing further comprising a plurality of segments movably supported one within each of said recesses, said segments having each a first surface conforming with clearance to the surface of its recesses, a second surface conforming with clearance to the surface of said shaft, and a third surface at one circumferential limit of its said second surface, said third surface conforming to the surface of said shaft with greater clearance than its said second surface, said bearing further comprising conduit means extending from the high pressure side of said compressor to said recesses, throttling means disposed in said conduit means, plural conduit means disposed in said stationary bearing portion connecting the clearance between said shaft and said portion adjacent each of the axially opposite ends of said segments with annular spaces disposed in said portion adjacent said ends respectively, and conduit means connecting said annular spaces with the low pressure side of said compressor.

References Cited in the file of this patent

UNITED STATES PATENTS

| | | |
|---|---|---|
| 1,272,041 | Herr | July 9, 1918 |
| 1,499,332 | Baumann | July 1, 1924 |
| 2,049,343 | Warren | July 28, 1936 |
| 2,864,552 | Anderson | Dec. 16, 1958 |

UNITED STATES PATENT OFFICE

CERTIFICATE OF CORRECTION

Patent No. 3,105,631                                           October 1, 1963

Jost Hänny

It is hereby certified that error appears in the above numbered patent requiring correction and that the said Letters Patent should read as corrected below.

Column 2, line 59, after "gas" insert -- of --; line 72, after "coupling" insert -- conduit --; column 3, line 16, for "other. There" read -- other, there --; column 8, line 48, for "recesses" read -- recess --.

Signed and sealed this 7th day of April 1964.

(SEAL)
Attest:

ERNEST W. SWIDER                            EDWARD J. BRENNER

Attesting Officer                                Commissioner of Patents